United States Patent [19]

Lamond

[11] Patent Number: 5,102,465
[45] Date of Patent: Apr. 7, 1992

[54] FILLER FOR POLYESTER MOLDING COMPOUND AND METHOD

[75] Inventor: Trevor G. Lamond, Quincy, Ill.

[73] Assignee: J. M. Huber Corporation, Rumson, N.J.

[21] Appl. No.: 641,223

[22] Filed: Jan. 15, 1991

Related U.S. Application Data

[62] Division of Ser. No. 304,694, Jan. 31, 1989, Pat. No. 5,015,295.

[51] Int. Cl.$^5$ .................................................. C09C 1/02
[52] U.S. Cl. ...................................... 106/465; 106/464
[58] Field of Search ..................... 106/464, 465, 241, ; 423/155, 173

[56] References Cited

U.S. PATENT DOCUMENTS 4,257,817  3/1981  Mathur et al. ...................... 106/266
4,767,464  8/1988  Strauch et al. ...................... 106/464

OTHER PUBLICATIONS

"Polyester Molding Compounds" by Robert Burns, 2nd edition, 1982, chap. 2, pp. 11–44.
"White Carbonate Fillers" by Coope and Dickson, *Industrial Mineral Pulp and Paper Survey*, 1984.
"Limestone Specifications" by Tim Power, *Industrial Minerals* Oct. 1985, pp. 65–91.
"White Carbonate Fillers", Dixon Industrial Minerals, Aug. 1987, pp. 65–73.
"*Aspects of the Geology of Tertiary Limestones in West-Central Jamaica, West Indies*", Wright, Raymond Marcio, Stanford University Ph.D., L976, Paleontology.
"*Biostratigraphical Studies on the Tertiary White Limestones in Parts of Trelawny and St. Anne, Jamaica*", Wright, Raymond, Masters Thesis, University of London, Oct. 1966.

*Primary Examiner*—William R. Dixon, Jr.
*Assistant Examiner*—Alan Wright
*Attorney, Agent, or Firm*—Alec H. Horn; Harold H. Flanders; Robert L. Price

[57] ABSTRACT

An improved dry ground calcium carbonate filler is provided which is less sensitive to variations in relative humidity and does not promote premature viscosity increase in polyester molding compound. This filler is dry ground from a Caribbean micritic limestone to produce Class I and Class II fillers which are acceptable for use in polyester molding compound applications. A polyester molding compound containing this dry ground filler produces a composite having superior izod impact resistance and surface quality. In some situations filler loading levels may be increased 10-15% in the SMC/BMC without detrimental effects on the final composite.

9 Claims, No Drawings

FILLER FOR POLYESTER MOLDING COMPOUND AND METHOD

This application is a division of application Ser. No. 304,694, filed Jan. 31, 1989, now U.S. Pat. No. 5,015,295.

FIELD OF THE INVENTION

This invention relates to an improved polyester molding compound and method, and more particularly, this invention relates to an improved calcium carbonate filler for use in the manufacture of polyester molding compound.

BACKGROUND OF THE INVENTION

Polyester molding compound is used in the manufacture of light-weight, glass reinforcedpolyester resin automotive parts and other general hardware which is made in heated matched metal dies or molds. Polyester molding compound is conventionally produced in the form of sheet molding compound (SMC) or bulk molding compound (BMC).

Sheet molding compound is made by dropping glass fibers onto the surface of a polyethylene film which has first been coated with a non-polymerized polyester resin paste. A similarly coated polyethylene film is placed coating to coating over the first film to form a sandwich composite. This composite is then squeezed to remove excess air and taken up onto a spool. This spool is stored at 70°-90° F. for one to ten days.

During this curing period, thickeners in the resin paste increase the paste viscosity from that of a relatively low viscosity liquid until ultimately a dry leather-like molding compound containing long glass fibers randomly dispersed in two dimensions is produced. In this manner fiber integrity is largely maintained since no intensive mixing is involved in the process. Fiber integrity is important in as much as the strength of the fiber reinforced composite is a function of fiber length, its dispersion, and its loading in the resin.

In order to obtain consistent manufacturing conditions, the initial paste viscosity of the polyester resin paste must be held within certain defined limits. The thickener in the resin is designed such that the viscosity of the paste increases slowly until after the glass fibers have had a chance to become coated or "wet out" in the resin. After a sufficient time has been allowed for thorough glass wet-out, the thickeners present in the paste affect a rapid increase in viscosity until approximately 20-60 million-centipoise (MMcps) is attained. Thereafter, the rate of increase in viscosity slows down. Accordingly, the initial increase in viscosity must be slow and reproducible in order to facilitate the manufacture of sheet molding compound in a highly automated environment Bulk molding compounds are similar in chemical composition to SMC compounds. The manufacturing process differs in that low intensity mixers are used to gently wet-out the glass fibers into the resin paste. This process allows the use of higher viscosity pastes. Thickeners may be used to obtain a further viscosity increase in some situations. While mixing times are kept as short as possible to minimize fiber degradation, extensive degradation does occur with fibers longer than ¼" in length. Thus, the BMC process typically employs fibers of this length or smaller.

Calcium carbonate fillers are used at high levels in polyester molding compounds to reduce costs, to improve surface finish by reducing resin shrinkage, and to modify the rheological behaviors of the paste to prevent segregation of the fiberglass during handling and storage. Although fillers are typically viewed as low cost bulking agents, they are critical to the processing of polyester molding compounds. The physical properties of the fillers must be maintained within certain tightly controlled limits to produce composites of consistent quality.

As the filler levels have increased through the years to provide improved surface finish, it has been a disadvantage that minor variations in the chemical and physical properties of the filler can cause significant variations in viscosity profile. This in turn results in manufacturing difficulties when using highly automated equipment. Further, variations in filler moisture levels are especially serious in their effect on the thickening rate of the polyester resin paste.

Because of its inherently low oil absorption, low moisture content and low cost, the most preferred filler used in polyester molding compound applications is calcium carbonate. The ores from which finely ground calcium carbonate fillers are produced for use in polyester molding compounds are found naturally in several forms. Broadly speaking, these forms are chalk, limestone, marble and dolomite. Precipitated calcium carbonate, which is a synthetically prepared product, is unacceptable for polyester molding compound applications due to its excessively high oil absorption.

Chalk is a soft, amorphous carbonate made up of the fossil shells of millions of tiny marine organisms. Accordingly, while the individual particles are rounded and quite strong in themselves, the bonding between particles is weak and easily broken. Hence, the comminution of chalk is essentially a process of gently breaking down the mineral into its fundamental particles. This may be accomplished either by dry grinding the chalk or wet grinding the chalk in a water slurry and segregating the desired fraction using water flotation techniques. Historically, the term "whiting" was used to describe finely pulverized chalk. This term is now inconsistently used to describe any finely ground calcium carbonate from any source, and therefore, for clarity this term is best avoided.

Limestone, marble, and dolomite are generally crystalline rocks whose particles and grinding display the characteristic rhombohedral structure of compact but pointed particles. Marble, limestone and dolomite are conventionally processed by one of two methods. The first and most energy efficient is dry grinding. Dry-ground limestone has been found unacceptable for use in polyester molding compounds because of excessive resin demand and excessive variation in the rate of viscosity increase in the manufacturing process.

The second method for processing limestone or marble is wet grinding wherein the limestone is crushed, made into a slurry with water and ground to the desired particle size. Thereafter, the limestone is filtered from the slurry and dried to produce a calcium carbonate filler. Wet ground calcium carbonates are the preferred filler in polyester molding compounds.

The wet grinding process requires the removal of substantial quantities of water from the processed slurry and, consequently, .this process requires substantially more energy than the dry grinding method. It is generally accepted that wet grinding calcium carbonate is between 15% to 25% more expensive than the dry grinding technique. Accordingly, it has long been desired to develop a dry-ground calcium carbonate which has the thickening consistency and loading capability of wet ground products Although attempts have been made to surface treat many of the above calcium carbonate fillers with silanes or fatty acids, such as stearic acid, these treatments have not been entirely successful although dispersion and oil absorption have been improved.

In the manufacture of polyester molding compound, two grades or types of calcium carbonate filler are used. The first is termed a Class I filler. Class I calcium carbonate fillers are a finely ground material having a median particle size between 2.0 to 4.0 microns and with at least 90% by weight less than 10 microns. This fine particle size filler is used in applications where surface finish is the most critical. However, because of the fine particle size, filler loadings must necessarily be restricted to lower levels. This is because of the higher oil absorption and resin demand of smaller particle size fillers. Class I fillers are known to produce composites having higher strength and superior surface finish.

The second type of filler is termed a Class II product. A Class II filler has a median particle size between approximately 5 to 10 microns with at least 98% by weight finer than 44 microns. A Class II filler has a lower surface area than the Class I filler and hence has a lower oil absorption and resin demand. Accordingly, Class II fillers may be placed in polyester molding compounds at much higher loading levels. The fraction greater than 44 microns must be kept below two percent to minimize imperfections in the composite surface. Therefore, samples made according to the present invention were formed into fillers of both the Class I and Class II variety for comparison with other fillers of the same class.

While calcium carbonate deposits are widely dispersed throughout the world, only a very few meet the exacting requirements necessary for a polyester molding compound filler. In the United States only high purity marble fillers have gained any significant usage. In Europe the high purity limestone from the Orgon deposit in France is preferred. Chalks, despite their wide spread availability, their ease of processing, and their high calcium carbonate content have not found extensive application as polyester molding compound fillers at the more preferred high loadings because of their extremely high oil absorption and moisture pickup values. Both of these factors follow from their extreme fineness and porosity.

The polyester molding compound maturation process is extremely moisture sensitive, and accordingly, the moisture content of the filler must be kept below 0.1%. This extreme moisture sensitivity leads to process stability problems. These process stability problems are especially severe during seasonal variations in temperature and relative humidity Because the filler moisture content is a function of the relative humidity of the filler storage area which is substantially uncontrollable, compounders have attempted to overcome these process consistency problems by numerous methods.

Compounders tried developing special seasonal recipes, purchasing resins to which free water has been added to a constant level or limiting the filler loading such that they obtain satisfactory glass wet-out and thickening even under the most adverse relative humidities encountered. These are less than optimum solutions since relative humidities only roughly follow seasonal patterns and limiting filler levels to cover worst case conditions unnecessarily increase the cost of the final resin-aglass composite.

These and other disadvantages of the prior art are overcome by the product and process of the present invention which is set forth in the following detailed description.

SUMMARY OF THE INVENTION

It has been found that in a polyester molding compound containing a polyester resin, chopped fiber, and a Class I calcium carbonate filler, an improvement comprising the Class I filler being a finely divided dry-ground micritic Carribbean limestone with a $CaCO_3$ content of at least 95%. This filler, when ground to a mean particle size in the range of 2 to 4 microns, has a Processing Stability Index less than about 150% and a Standard 30-Minute Viscosity of less than about 0.5 MMcps.

It has further been found that in a polyester molding compound containing a polyester resin, chopped fiber and a Class II calcium carbonate filler, an improvement comprising the Class II calcium carbonate filler being a finely divided, dry-ground micritic Caribbean limestone with a $CaCO_3$ content of at least 95%. This filler, when ground to a median particle size in the range of 4 to 10 microns, has a Processing Stability Index less than about 15% and a Standard 30-Minute Viscosity of less than about 0.07 MMcps.

It is an object of the present invention to provide a calcium carbonate filler by dry grinding which is suitable for use in a polyester molding compound at high filler loadings without adversely effecting the composite quality.

It is another object of the present invention to provide a calcium carbonate filler which may be incorporated into a polyester molding compound at higher loadings without adversely effecting either the process for making the polyester molding compound or the quality of the final composite.

It is another object of the present invention to provide a calcium carbonate filler which is less sensitive to variations in relative humidity.

It is another object of the present invention to provide a calcium carbonate filler which does not promote premature viscosity increase in the polyester resin paste to allow time for adequate wet-out of the reinforcing chopped glass fibers.

It is a feature of the present invention to provide a calcium carbonate filler that improves surface quality when used in a polyester molding compound composite.

It is another feature of the present invention to provide a calcium carbonate filler that improves impact resistance when used in a polyester molding compound composite.

These and other features and objects of the present invention will become apparent when reference is made to the following detailed description.

DETAILED DESCRIPTION OF PREFERRED EMBODIMENTS

It is a discovery of the present invention that a unique, high purity calcium carbonate of sedimentary origin, commonly known as Caribbean limestone, may be utilized to produce a filler which is acceptable for polyester molding compound applications. Caribbean limestone is an almost chalk-like calcium carbonate which is very soft and breaks readily into very fine particles.

Calcium carbonates which are of sedimentary origin include reef limestone, which is made up of reef-existing fossil fragments; betrital limestone, which is made up of fibrous skeletal and non-skeletal grains, including pelloids, ooids, and infraclasts; micrite, which is a naturally precipitated calcium carbonate which forms into beds or is found in a matrix with betrital limestones; and chalk, which is made up of disarticulated caccolith fragments. Caribbean limestone is sedimentary in origin and exists as combinations of all of the above types, i.e. reefs, betritals, micrites and chalk. This Caribbean limestone, or as referred to herein as micritic limestone, is extremely pure with some deposits having calcium carbonate contents in excess of 98% and generally containing no alpha quartz.

Extremely pure limestones are relatively uncommon. One known high purity limestone formation is the Orgon deposit in France. Although the existence of the micritic limestone deposits have been known for many years, they have heretofore been thought to possess no commercial utility because of their perceived close similarity to chalk which is abundant throughout the world at high purity levels.

It is a discovery of the present invention that these heretofore commercially undesirable limestones when dry ground can produce a calcium carbonate filler which may be utilized in polyester molding compound applications at loading levels heretofore unattainable without degradation of composite performance.

Deposits of micritic limestone are found throughout the Caribbean basin with significant deposits found on the islands of Haiti and Jamaica.

EXAMPLES

A method for producing the product of the present invention includes the steps of taking a high purity (greater than 95% and preferably greater than 98% calcium carbonate) Jamaican micritic limestone as described above and crushing into nuggets approximately 2 inches in diameter to obtain an easily workable crude feedstock. At this point the micritic Caribbean limestone contains approximately 14% by weight moisture This crushed Jamaican micritic limestone is then fed into a Raymond roller mill equipped with a mill furnace to remove superficial moisture and conventionally dry ground to a desired particle size. Upon leaving the roller mill, the pulverized limestone is split into two streams. The coarser of the two streams, which is 98% less than 44 microns, is collected in a cyclone to form Example 2 which is a Class II filler. The finer, second stream, which has a median particle size of approximately 3 microns, is collected in a bag filter to form Example 1, which is a Class I filler. The mill furnace is operated to ensure that moisture levels of all samples are below 0.05%. Using this method, a Haitian micritic limestone was dry ground to prepare a Class II filler, Example 4, and a Class I filler, Example 3. These sample calcium carbonate fillers were packaged into perforated kraft bags to allow free exchange with the atmosphere's moisture.

In order to compare Examples 1-4 of the present invention with prior art calcium carbonate fillers, a standardized group of measurement procedures were developed. These tests, to the extent practicable, reflect actual processing conditions which are of concern.

Chosen to be the standard resin system was an unsaturated polyester resin sold under the tradename OCF4297-5 and available from Owens Corning Fiberglass of Granville, Ohio. This resin was selected among many resin systems commercially available because it is highly moisture sensitive and may be handled conveniently in a laboratory. The measurements developed are termed the Standard 30-Minute Viscosity and the Processing Stability Index.

To measure the Standard 30-Minute Viscosity of a calcium carbonate filler, 100 parts by weight of OCF4297-5 polyester resin is poured into a pint can and 2.5 parts by weight of testiary butyl perbenzoate (TBPB) catalyst is carefully metered in with a syringe. In a separate container a series of dry powders are preblended. These dry powders are 190 phr of the filler which has been preconditioned at 75% relative humidity for 24 hours, 2 phr VR-3 a viscosity reducing additive from Union Carbide of Danbury, Connecticut, 4 phr zinc stearate, 3 phr Merck Marinco "H", a magnesium hydroxide thickener available from Merck Chemical of San Francisco, California, and 0.4 small PHR Merck Maglite A, a magnesium oxide thickener also from Merck Chemical.

These preblended dry powders are slowly added to the resin and catalyst mixture while the mixture is being stirred at 2500 RPM by a Cowles dissolver. The mixing is continued until a temperature of 90° F. is obtained. All viscosities are measured using a Brookfield HBT viscometer with a No. 5 spindle. The initial viscosity measurement is taken 4 minutes after the dry powders have been added to the resin. All other times are incremental from this initial point. The sealed pint cans are thereafter placed in a 90° F. oven for the maturation process and periodically the viscosity is measured After a 30-minute time increment, the viscosity is measured and this number, expressed in MMCPS, is the Standard 30-Minute Viscosity ($V_{75}$).

The significance of the Standard 30-Minute Viscosity is that different calcium carbonate fillers used in polyester molding compound applications produce different rates of viscosity increase over time. It is important to the polyester molding compound manufacturing process that the viscosity of the polyester resin paste be sufficiently low at the early stages of the process to permit adequate wetting of the chopped glass fiber and adequate dispersion of the calcium carbonate filler. Thereafter, the viscosity should rapidly increase with time until a tough leather-like polyester molding compound is formed. In order to provide a safety margin in the processing of the polyester molding compound, it is conventional in the industry to add no more filler than will produce an acceptable viscosity during the initial glass wetting period. For this reason, together with the pronounced variations due to relative humidity, less calcium carbonate filler is used than would be economically desirable.

Another procedure established to measure calcium carbonate filler performance is the Processing Stability Index. In this test a calcium carbonate filler sample is divided into two portions. Each portion is preconditioned in a constant relative humidity chamber for 24 hours at 50% relative humidity and 75% relative humidity, respectively. Each filler portion is compounded at 190 phr into a OCF4297-5 polyester resin as described above. After a 30-minute increment, the viscosity is measured. The difference between the 75% RH viscosity ($V_{75}$) and the 50% RH viscosity ($V_{50}$) is divided by the 50% RH viscosity and then multiplied by 100 to be expressed as a percent.

$$\frac{V_{75} - V_{50}}{V_{50}} \times 100 = PSI\,\%$$

The significance of this Processing Stability Index is that it measures the susceptibility of the calcium carbonate filler to vary the paste viscosity as the relative humidity of the storage environment changes. A filler with a lower Processing Stability Index will effect a significant improvement in the manufacturing of polyester molding compounds during periods of changing climatic conditions.

In order to compare calcium carbonate fillers of the present invention with those of the prior art a series of representative samples of available calcium carbonate fillers were obtained. The chemical composition of various calcium carbonate ores was determined by standard ASTM methods used in the mineral filler industry and the results are set forth in Table I, below. Unless otherwise specified all percentages are percentages by weight.

TABLE I

| Ore Type | CaCO3, % | MgCo3, % | Acid Insol, % | Silica, % |
|---|---|---|---|---|
| Maryland Marble | 91.0 | 6.6 | 2.3 | 0.8 |
| Alabama Marble | 96.4 | 2.1 | 1.2 | 0.98 |
| English Chalk | 97.4 | 1.0 | 1.5 | 0.68 |
| French Orgon Limestone | 98.7 | 0.43 | 0.16 | 0.02 |
| Jamaican Micrite Limestone | 99.4 | 0.41 | 0.17 | 0.02 |
| Haitian Micrite Limestone | 99.6 | 0.30 | 0.00 | 0.04 |
| Dominican Rep. Micrite Limestone | 99.4 | 0.43 | 0.16 | 0.00 |

In comparing the calcium carbonate ores from which the fillers are made, it may be seen that the micrite limestone of the present invention has a very high calcium carbonate content with very low impurities of magnesium, silica and acid insoluble material. Only the very high purity French Orgon limestone approaches the purity of the micritic limestone. It should be noted that marble ore, which is the source of most commercially available calcium carbonate fillers, has significantly higher impurities.

Class I fillers made according to the present invention, Examples 1 and 3, were compared to commercially available Class I fillers of the prior art. Similarly, Class II fillers made according to the present invention, Examples 2 and 4, were compared to Class II fillers of the prior art. Particle size was determined by Quantachrome Microscan analyzer and moisture content, measured after coming to equilibrium in a controlled relative humidity cabinet, was determined by a Carl-Fischer moisture analyzer The prior art Class I fillers evaluated were as follows:
SNOWCAL 60, a dry ground English chalk available from Blue Circle Company;
CAMELWITE, a wet ground high purity marble available from Genstar Corporation of Texas, Maryland; and
MILLICARB, a wet ground high purity Orgon limestone available from Pluess-Stauffer of Paris, France.

Of the above Calss I fillers, SNOWCAL 60 is generally not acceptable to the polyester molding compound industry.

The prior art Class II fillers compared were as follows:
CAMEL-FIL, a wet ground high purity marble,
CAMEL-CARB, a dry ground high purity marble, and
CAMEL-TEX, a dry ground high purity marble, all available from Genstar Corp. of Texas, Maryland;
GAMA PLUS, a dry ground high purity marble,
CALWHITE II, a wet ground high purity marble, both available from Georgia Marble of Atlanta, Georgia
SNOWFLAKE, a wet ground, high purity marble available from Engish China Clay of Atlanta, Georgia;
OMYA BL, a wet ground, high purity Orgon limestone available from Pluess-Stauffer of Paris, France Of the above Class II fillers, only OMYA BL, SNOWFLAKE, CALWHITE II, and CAMEL-FIL are generally acceptable to the polyester molding industry. Physical properties of these fillers, along with Examples 1, 2, and 4 were determined and results are set forth in Tables 2 and 3.

TABLE 2

| | Class I Fillers | | |
|---|---|---|---|
| | Median Particle | Moisture Content, % | |
| Filler | Size, % | 50% R.H. | 75% R.H. |
| Example 1 | 3.0 | .05% | .073% |
| MILLICARB | 2.8 | .08% | .144% |
| SNOWCAL 60 | 2.8 | .09% | .17% |
| CAMEL-WITE | 2.7 | .11% | .131% |
| MICROCARB 5 | 2.4 | .26% | .32% |

TABLE 3

| | Class II Fillers | | |
|---|---|---|---|
| | Median Particle | Equilibrium Moisture Content, % | |
| Filler | Size, Microns | 50% R.H. | 75% R.H. |
| Example 2 | 6.6 | .04% | .06% |
| Example 4 | 7.8 | .03% | .05% |
| OMYA BL | 5.4 | .05% | .07% |
| CAMEL-FIL | 6.6 | .06% | .09% |
| SNOWFLAKE | 5.0 | .04% | .09% |
| CALWHITE II | 6.4 | .04% | .09% |
| CAMEL-CARB | 9.0 | .05% | .10% |
| CAMEL-TEX | 5.4 | .09% | .13% |
| GAMA PLAS | 7.1 | .06% | .10% |

It may be seen by looking at the equilibrium moisture content at 50% and 75% relative humidity, respectively, that the dry ground English chalk and the dry-ground marbles pick up substantially more moisture than the other fillers and for this reason are not accepted by industry as desirable for use in high loading polyester molding compound applications.

The Standard 30-Minute Viscosity and the Processing Stability Index were determined according to the methods previously described and set forth in Table 4 and 5.

TABLE 4

| Processing Stability Indices for Various Class I Fillers | | | |
|---|---|---|---|
| | 30 Min. Viscosity, MMcps | | |
| Filler | 50% R.H. | 75% R.H. | PSI % |
| Example 1 | .131 | .173 | 32 |
| MILLICARB | .211 | .640 | 203 |
| CAMEL-WITE | .240 | 1.18 | 392 |

TABLE 4-continued

Processing Stability Indices for Various Class I Fillers

| Filler | 30 Min. Viscosity, MMcps | | PSI % |
|---|---|---|---|
| | 50% R.H. | 75% R.H. | |
| SNOWCAL 60 | .544 | 3.20 | 488 |

TABLE 5

Processing Stability Indices of Various Class II Fillers

| Filler | 30 Min. Viscosity, MMcps | | PSI % |
|---|---|---|---|
| | 50% R.H. | 75% R.H. | |
| Example 4 | .036 | .038 | 5.5 |
| Example 2 | .054 | .056 | 3.7 |
| CAMEL-CARB | .085 | .099 | 19.3 |
| SNOWFLAKE | .048 | .073 | 52.1 |
| CAMEL-TEX | .115 | .147 | 27.8 |
| OMYA BL | .074 | .101 | 36.5 |
| GAMA PLAS | .085 | .112 | 34.9 |
| CAMEL-FIL | .066 | .110 | 66.7 |

In order to illustrate the resin paste viscosity increase found in a typical SMC molding formulation, Example 4, a Class II filler made from Haitian micritic limestone as described previously, was compared to SNOWFLAKE and CAMEL-FIL calcium carbonate Class II fillers of the prior art. These fillers were preconditioned at 20%, 70% and 90% respectively and 235 phr filler was compounded into an unsaturated polyester resin sold under the name OCF ATRYL available from Owens-Corning Fiberglass of Granville, Ohio. The viscosity of each sample was measured periodically and the results set forth in Table 6.

TABLE 6

Effect of Filler Pre-Conditioning Class II Filler on SMC Thickening (OCF Atryl Resin, 235 prh)

| | Preconditioned At Relative Humidities | Filler Moisture, % | SMC Paste Viscosity, Mcps | | | |
|---|---|---|---|---|---|---|
| | | | Init. | 30 Min. | 60 Min. | 24 Hr. |
| SNOWFLAKE | 20 | .07 | 44 | 86 | 120 | 785 |
| | 70 | .11 | 46.8 | 104 | 194 | 1,008 |
| | 95 | .13 | 61 | 201 | 336 | 5,400 |
| CAMEL-FIL | 20 | .06 | 41 | 72 | 135 | 825 |
| | 70 | .11 | 42.4 | 101 | 190 | 1,016 |
| | 95 | .14 | 54 | 230 | 384 | 6,800 |
| Example 2 | 20 | .04 | 37 | 46 | 59 | 214 |
| | 70 | .06 | 37 | 48 | 61 | 256 |
| | 95 | .08 | 38 | 48 | 64 | 368 |

It may be seen that the rate of resin paste viscosity increase with time using the filler of the present invention is much less pronounced and less subject to variation with changes in the relative humidity of the environment. Accordingly, it is believed that the filler content of this resin paste system could be increased by 5-10% without the early viscosity of the paste detrimentally effecting the wetting of the glass fibers in an SMC compound. Further an adequate safety margin to compensate for variations in relative humidity would be provided even at these higher filler loading levels.

In order to compare composites made by the polyester molding compound of the present invention with prior art composites, test composite panels were made using Example 2, a Class II filler of the present invention. Chosen as a comparison composite was CAL-WHITE II in a structured SMC resin system manufactured by Ashland Chemical Company of Dublin, Ohio. Upon evaluation using standard techniques of the industry, it was observed that the composite using Example 2, the filler of the present invention, attained a lower initial thickening, comparable ultimate thickening, comparable shrinkage, a 34% improvement in surface quality, a 35% improvement in tensile strength, a 18% improvement in modulus, a slightly improved flexual strength and an improvement in izod impact toughness of 48%. Accordingly, it may be seen that the filler of the present invention met or exceeded the performance characteristics of the more energy intensive typical wet ground sample of the prior art.

In order to more fully compare the filler of the present invention to prior art fillers, Examples 1 and 3 were compared with another Class I and Class II filler in a PHASE ALPHA resin system of Ashland Chemical Corporation of Dublin, Ohio. The results are set forth in Table 7.

TABLE 7

Effect of Filler on Physical Properties of Composites

| | Class I Example 1 vs. CAMEL-WITE | Class II Example 4 vs. SNOWFLAKE |
|---|---|---|
| LOADING | +15% | +10% |
| Tensile Str. (psi) | +26% | +13.6% |
| Tensile Mod. (psi) | +10.7% | +33% |
| % Elongation | +15.6% | −7.0% |
| Flex Str. (psi) | +18.4% | +13.1% |
| Flex Modulus (psi) | +4% | +1% |
| IZOD: | | |
| Notched (ft-lb/in) | +8.6% | −4.9% |
| Unnotched (ft-lb/in) | +22.1% | +19.9% |

It may be seen that substantial increase in filler loading was attained using Examples 1 and 2 without reduction in composite performance.

In order to further compare the present invention with calcium carbonate fillers of the prior art in BMC composite applications, a bulk molding compound composite was made by mixing 100 OCF429715 polyester resin with 0.5 MAGLITE A, 1.5 phr TBPB, and 5 phr zinc stearate and a specified amount of filler, for two minutes in a high speed cowles dissolver. After cooling the paste below 90° F., the paste was poured into a slow-speed sigma blade mixer along with sufficient ¼" chopped fiberglass to give a nominal 20% glass content and mixed for a further two minutes. After sitting for 24 hours the compound was injection molded at 300° F. to produce final composites for testing. The data are set forth in Table 8 below.

TABLE 8

Izod Impact Data on BMC Composites (OCF 4297-5 Resin)

| Filler | Loading phr | Paste Viscosity | Notched Impact, ft/lb | Unnotched Impact, ft/lb | Tensile (psi) |
|---|---|---|---|---|---|
| CAMEL-WITE | 176 | 64,000 | 4.57 | 6.01 | 5.05 |
| Example 1 | 180 | 36,800 | 6.25 | 8.07 | 4.78 |
| SNOWFLAKE | 200 | 64,000 | 4.11 | 4.18 | 4.52 |
| CAMEL-FIL | 200 | 54,400 | 3.89 | 4.61 | 3.92 |
| HUBERCARB W4 | 200 | 44,800 | 4.77 | 5.51 | 4.35 |
| Example 2 | 200 | 44,000 | 5.17 | 6.18 | 3.72 |
| Example 4 (Haitian) | 200 | 38,400 | 5.77 | 5.58 | 3.09 |

Accordingly it is seen that composites using the Examples of the present invention obtain substantial improvements in physical properties at similar loading levels are obtained using conventional wet ground calcium carbonate fillers.

What is claimed is:

1. In a polyester molding compound containing a polyester resin, chopped fiber and a Class I calcium carbonate filler, the improvement comprising:

the calcium carbonate filler being a finely divided dry ground micritic limestone having a $CaCO_3$ content of at least 95% by weight with no more than about 5% by weight impurities, said filler having a median particle size in the range of 2 to 4 microns;

a Standard 30-Minute Viscosity of less than about 0.500 MMcps; and a Processing Stability Index of less than about 150%.

2. The polyester molding compound of claim 1 wherein the micritic limestone is at least 98% $CaCO_3$ by weight, said filler having with less than 0.3% acid insoluble less than 0.1% silica and less than 1% $MgCO_3$.

3. The polyester molding compound of claim 1 wherein the filler has a median particle size in the range of 2.5 to 3.5 microns.

4. The polyester molding compound of claim 1 wherein the filler has a Standard 30-Minute Viscosity of less than about 0.25 MMcps.

5. The polyester molding compound of claim 3 wherein the filler has a Process Stability Index of less than about 50%.

6. In a polyester molding compound containing a polyester resin, chopped fiber and a Class Ii calcium carbonate filler, the improvement comprising:

the calcium carbonate filler being finely divided dry-ground micritic limestone having a $CaCO_3$ content of at least about 95% by weight with no more than 5% by weight impurities, said filler having a median particle size in the range of 4 to 10 microns a Processing Stability Index less than about 15%, and a Standard 30-Minute Viscosity of less than about 0.07 MMcps.

7. The polyester molding compound of claim 6 wherein the micritic limestone is at least 98% $CaCO_3$ by weight, said filler having less that 0.3% acid insolubles, less than 0.1% silica and less than 1% $MgCO_3$.

8. The polyester molding compound of claim 6 wherein the filler has a median particle size in the range of 4.5 to 8 microns.

9. The polyester molding compound of claim 6 wherein the filler has a Processing Stability Index of less than about 8%.

* * * * *